(12) United States Patent
Nieuwsma et al.

(10) Patent No.: US 11,885,081 B2
(45) Date of Patent: Jan. 30, 2024

(54) MILLING MACHINE WITH HYDRAULICALLY ACTUATED ROTOR DRIVE TRANSMISSION

(71) Applicant: Caterpillar Paving Products Inc., Brooklyn Park, MN (US)

(72) Inventors: Derek P. Nieuwsma, Loretto, MN (US); Nathaniel S. Doy, Maple Grove, MN (US); Brian J. Schlenker, Shoreview, MN (US); Ryan A. Enot, Dunlap, IL (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 94 days.

(21) Appl. No.: 17/399,786

(22) Filed: Aug. 11, 2021

(65) Prior Publication Data
US 2023/0051433 A1   Feb. 16, 2023

(51) Int. Cl.
*E01C 23/088* (2006.01)
*E01C 23/12* (2006.01)
(Continued)

(52) U.S. Cl.
CPC .......... *E01C 23/088* (2013.01); *E01C 23/127* (2013.01); *E01C 2301/00* (2013.01);
(Continued)

(58) Field of Classification Search
CPC .. E01C 23/088; E01C 23/127; E01C 2301/00; F15B 15/20; F16H 61/0025;
(Continued)

(56) References Cited

U.S. PATENT DOCUMENTS 8,056,666 B2   11/2011   Portell et al.
8,316,806 B2   11/2012   Söderberg et al.
(Continued)

FOREIGN PATENT DOCUMENTS

CN   201779218 U   3/2011
DE   102012012738 A1 *   1/2014   ............. F16H 47/02
(Continued)

OTHER PUBLICATIONS

English Language Machine Translation of Wachsmann et al. DE-102012012738-A; published Jan. 2, 2014 (7 pages) (Year: 2014).*

(Continued)

*Primary Examiner* — Abby J Flynn
*Assistant Examiner* — Michael A Goodwin
(74) *Attorney, Agent, or Firm* — Leydig, Voit & Mayer, Ltd.

(57) ABSTRACT

A milling machine includes a rotor drive transmission having a plurality of gears disposed between a prime mover and a cutting rotor. The rotor drive transmission is associated with a rotor transmission hydraulic circuit including a hydraulic gearshift actuator to engage the plurality of gears in one or more gear ratios and a gearshift directional control valve to direct hydraulic fluid to and from the hydraulic gearshift actuator. In occurrence of a fault condition, the rotor transmission hydraulic circuit includes a gearshift trapping valve to maintain hydraulic pressure in the hydraulic gear actuator and the engaged gear ratio of the rotor drive transmission.

16 Claims, 4 Drawing Sheets

(51) Int. Cl.
<table>
<tr><td>F16H 61/30</td><td>(2006.01)</td></tr>
<tr><td>F16H 61/00</td><td>(2006.01)</td></tr>
<tr><td>F16H 61/12</td><td>(2010.01)</td></tr>
<tr><td>F15B 15/20</td><td>(2006.01)</td></tr>
<tr><td>F16H 61/28</td><td>(2006.01)</td></tr>
</table>

(52) U.S. Cl.
CPC .......... *F15B 15/20* (2013.01); *F16H 61/0025* (2013.01); *F16H 61/12* (2013.01); *F16H 61/2807* (2013.01); *F16H 61/30* (2013.01); *F16H 2061/1244* (2013.01); *F16H 2061/1268* (2013.01)

(58) Field of Classification Search
CPC ............. F16H 2061/0288; F16H 61/12; F16H 2061/1244; F16H 2061/1252; F16H 2061/126; F16H 2061/1268; F16H 61/2807; F16H 61/30
See application file for complete search history.

(56) References Cited

U.S. PATENT DOCUMENTS

| | | |
|---|---|---|
| 9,845,590 B2 | 12/2017 | Spielman |
| 9,958,060 B2 | 5/2018 | Boston et al. |
| 10,190,645 B2 | 1/2019 | Lister |
| 10,233,599 B2 | 3/2019 | Mui et al. |
| 2006/0234826 A1* | 10/2006 | Moehlmann ............ F16H 61/30 477/38 |
| 2013/0232962 A1 | 9/2013 | Marin et al. |
| 2013/0300182 A1* | 11/2013 | Hammes ................ E01C 23/127 299/39.4 |
| 2017/0146076 A1 | 5/2017 | Lister et al. |
| 2018/0135257 A1 | 5/2018 | Schlenker et al. |
| 2018/0266552 A1* | 9/2018 | Berning .................... F16H 7/22 |
| 2018/0274184 A1 | 9/2018 | Schlenker |
| 2020/0318297 A1* | 10/2020 | Bötzius ................. E01C 23/088 |
| 2021/0239205 A1* | 8/2021 | Weinl ................... F16H 61/2807 |

FOREIGN PATENT DOCUMENTS

| | | | |
|---|---|---|---|
| DE | 102013213537 A1 * | 1/2015 | ............ F15B 11/003 |
| DE | 102019123982 A1 * | 3/2021 | |
| EP | 0614030 A1 | 9/1994 | |
| JP | 3185067 B2 | 7/2001 | |
| JP | 2010-121699 A | 6/2010 | |

OTHER PUBLICATIONS

English Language Machine Translation of Escher et al. DE-102013213537-A; published Jan. 15, 2015 (9 pages) (Year: 2015).*

* cited by examiner

| Operating State | Solenoid Energized | Solenoid De-Energized |
|---|---|---|
| Gearshift Directional Control Valve | Flow from Hydraulic Pump to Hydraulic Gearshift Actuator | Flow from Gearshift Actuator to Fluid Reservoir |
| Gearshift Trapping Valve | Two Direction Flow between Gearshift Actuator and Rotor Transmission Hydraulic Circuit | One Direction Flow from Rotor Transmission Hydraulic Circuit to Gearshift Actuator |

FIG. 3

MILLING MACHINE WITH HYDRAULICALLY ACTUATED ROTOR DRIVE TRANSMISSION

TECHNICAL FIELD

This patent disclosure relates generally to a machine for milling a work surface such as a rotary mixer equipped with a cutting rotor that can be rotatably driven with respect to the work surface and, more particularly, to a hydraulically actuated rotor transmission operatively associated with the cutting rotor.

BACKGROUND

There exist various propelled milling machines for removing or milling material such as pavement, asphalt, or concrete from a work surface such as a roadway or similar surfaces. For example, a rotary mixer is a type of propelled machine that includes a cutting rotor rotatably supported by a machine frame that can traverse a work surface by, for example, a plurality of wheels. As the rotary mixer travels over the work surface, the cutting rotor can be lowered into and penetrate the work surface and thereby fragment and break apart the top layer of the work surface. In the example of a rotary mixer, the fragments and debris are left on the work surface and can be reused as aggregate in a subsequent paving operation. In another example, a cold planer is a similar type of propelled machine with a cutting rotor operatively associated with a conveyor to receive and remove the debris from the work surface, for example, by directing the material to a haul truck leading or following the cold planer.

To both propel the milling machine and rotatably drive the cutting rotor, a prime mover such as an internal combustion engine may be included that generates power in the form of rotational motion that can be transmitted to various driven elements like the propulsion components and cutting rotor. Because the internal combustion engine may be designed to operate at particular speeds or rpms, or may operate most efficiently at particular speeds or rpms, which are different than the desired speed of the driven elements, it is often necessary to include speed reduction machinery such as transmissions or gear trains operatively associated with the driven elements. In addition, in the case of a cutting rotor, it may be desirable to adjust the torque or rotational force at which the cutting rotor rotates based on the material being milled, for example, asphalt versus soil.

U.S. Publication No. 2018/0135257, assigned to the assignee of the present application, describes a rotary mixer equipped with a rotor transmission including gearboxes of selectively engageable gears for adjusting the speed and/or torque of the cutting rotor. The rotor transmission can receive power output from the internal combustion engine and can selectively engage and disengage gears to adjust the rotational speed directed to the cutting rotor. The present application is directed to a similar rotor transmission operatively associated with a cutting rotor on a propelled milling machine and particularly to a rotor transmission hydraulic circuit for such as machine.

SUMMARY

The disclosure describes, in one aspect, a propelled milling machine for milling a work surface like a roadway covered in asphalt or pavement. The milling machine includes a machine frame supported on a plurality of propulsion components for travel over a work surface and an internal combustion engine operatively connected with the propulsion components for propelling the machine. To mill the work surface, a cutting rotor is rotatably supported by the machine frame. A rotor drive transmission is disposed between the internal combustion engine and the cutting rotor to transfer motive power there between. To adjust rotational speed of the cutting rotor, the rotor drive transmission includes a plurality of gears selectively engageable with each other to adjust rotational speed of the cutting rotor including at least a high gear ratio and a low gear ratio. To selectively engage the gears, a rotor transmission hydraulic circuit can be included. The rotor transmission hydraulic circuit can be in fluid communication with a hydraulic pump to receive hydraulic fluid and in fluid communication with a fluid reservoir to discharge hydraulic fluid. The rotor transmission hydraulic circuit includes a hydraulic gearshift actuator operatively associated with the plurality of gears, a gearshift directional control valve to selectively establish fluid communication between the hydraulic gearshift actuator and one of the hydraulic pump and the fluid reservoir, and a gearshift trapping valve disposed in fluid communication between the hydraulic gearshift actuator and the gearshift directional control valve. In the event of a fault condition, the gearshift trapping valve is configured to maintain hydraulic pressure in the hydraulic gearshift actuator.

In another aspect, the disclosure describes a method of operating a rotor drive transmission on a propelled milling machine. In accordance with the method, a gearshift directional control valve is actuated to direct pressurized hydraulic fluid from a hydraulic fluid source to a hydraulic gearshift actuator operatively associated with the rotor drive transmission. Actuation of the hydraulic gearshift actuator engages a plurality of gears in the rotor drive transmission to establish a gear ratio of the rotor drive transmission. Engagement of the gear ratio transmits motive power from an internal combustion engine to a cutting rotor through the rotor drive transmission in gear ratio. In the event a fault condition occurs with the rotor drive hydraulic circuit, a gearshift trapping valve disposed between the gearshift directional control valve and the hydraulic gearshift actuator is actuated to maintain hydraulic pressure in the hydraulic gearshift actuator In yet another aspect of the disclosure, there is described a rotor transmission hydraulic circuit operatively associated with a rotor transmission disposed between an internal combustion engine and a cutting rotor. The rotor transmission hydraulic circuit includes a hydraulic gearshift actuator operatively associated with the plurality of gears to selectively engage the plurality of gears in one or more gear ratios. The rotor transmission hydraulic circuit a gearshift directional control valve to selectively establish fluid communication between the hydraulic gearshift actuator and one of a hydraulic pump and a fluid reservoir. A gearshift trapping valve is disposed in fluid communication between the hydraulic gearshift actuator and the gearshift directional control valve. The gearshift trapping valve can be positioned to establish fluid communication between the hydraulic gearshift actuator and the gearshift directional control valve when energized and to maintain hydraulic pressure in the hydraulic gearshift actuator when de-energized.

BRIEF DESCRIPTION OF THE DRAWINGS

FIG. 3 is a chart representing different configurations for the rotor transmission hydraulic circuit based on operating conditions and operating parameters of the rotor drive transmission including during a fault condition.

DETAILED DESCRIPTION

Figure 1:
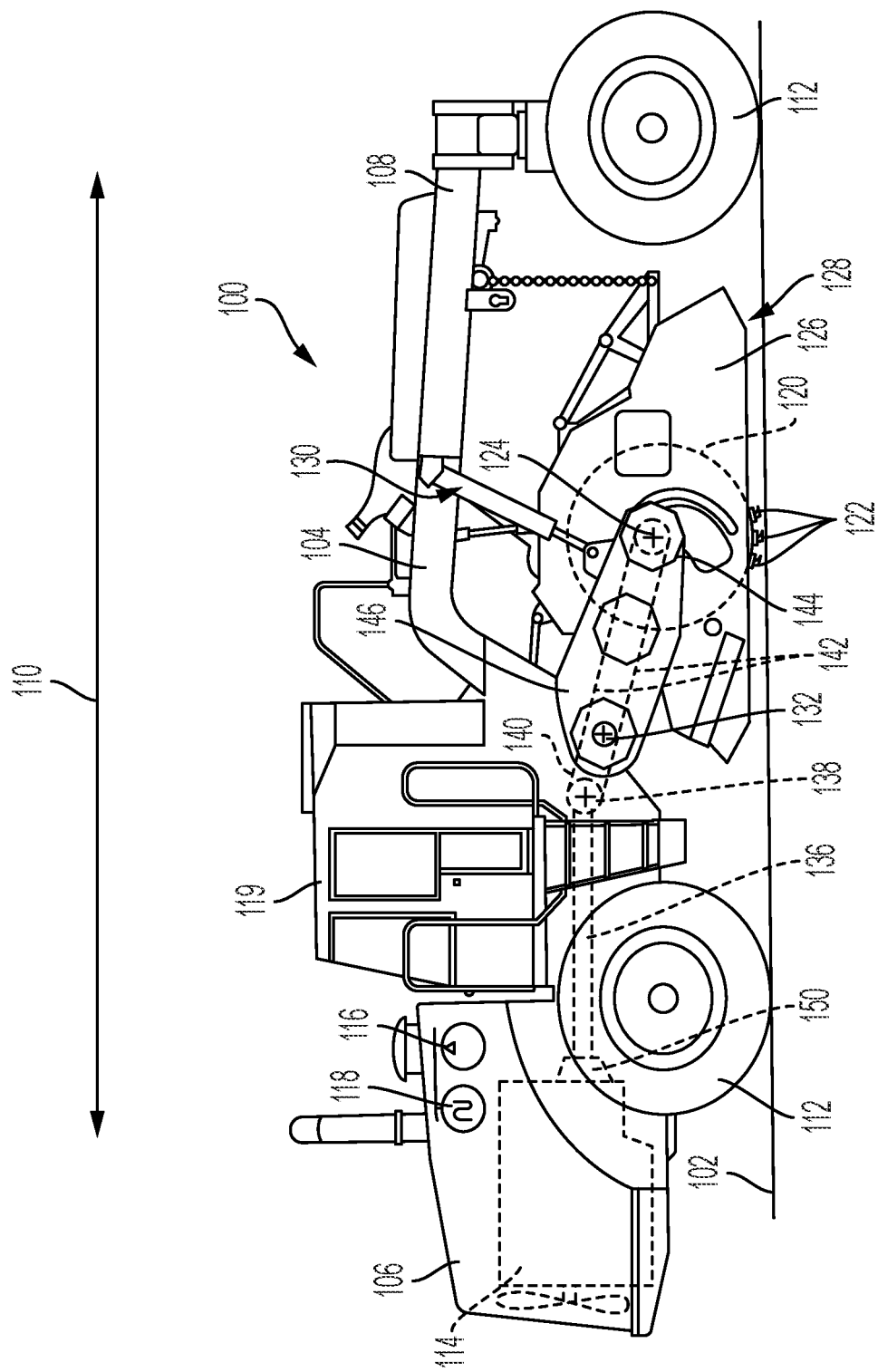
FIG. 1 is a side elevational view of a propelled milling machine, particularly a rotary mixer, including a cutting rotor rotatably driven with respect to the work surface via a rotor drivetrain.

Now referring to the drawings, wherein whenever possible like reference numbers refer to like features, there is illustrated in FIG. 1 a propelled machine in the particular embodiment of a rotary mixer 100 that, as familiar to those of skill in the art, are utilized in road repair and repaving operations. Rotary mixers 100 are configured to remove and reclaim or reuse a layer of a work surface 102 such as pavement, concrete, asphalt, or other material by penetrating into and fracturing the work surface in a milling operation. The fractured material may be redeposited on the work surface 102 where it can be used as a foundation or base aggregate in a subsequent paving operation. In addition to rotary mixers, the present disclosure is applicable to other propelled milling machines such as road planers that can mill, remove, and transfer a layer of the work surface to a haul truck, soil reclaimers for churning and relaying soil, and other machines used in work surface milling operations and similar operations in construction and agriculture.

The rotary mixer 100 can include a machine frame 104 that may be oriented with a forward end 106 and a rearward end 108 that are aligned along a travel direction 110 of the machine; however, because the rotary mixer 100 may operate in both forward and reverse directions, the designations are used herein primarily for reference purposes. The machine frame 104 can be manufactured from heavy gauge steel plates and structural beams. To enable the rotary mixer 100 to travel over the work surface 102, the machine frame 104 can be supported on a plurality of propulsion components 112, and thus the designation of the rotary mixer 100 as a propelled or mobile milling machine. In the illustrated embodiment, the propulsion components 112 can be rotatable wheels that can include rubber pneumatic tires. A pair of wheels may be located at the forward end 106 and a second pair may be located at the rearward end of the rotary mixer 100. The wheels may be designated as powered drive wheels to propel the rotary mixer 100, steerable wheels to adjust direction of the rotary mixer, or combinations thereof. Another suitable embodiment of propulsion components 112 includes continuous tracks such as a closed belt disposed about rollers and/or sprockets where translation of the belt carries the rotary mixer 100 over the work surface 102.

To power the propulsion components 112 and other systems of the rotary mixer 100, a power source such as an internal combustion engine 114 can be disposed on the machine frame 104. The internal combustion engine 114 can burn a hydrocarbon-based fuel like diesel or gasoline and convert the latent chemical energy therein to a mechanical motive force in the form of rotary motion, or torque that can be harnessed for other useful work. The rotary output of the engine 114 can be transmitted through a crankshaft extending from the engine and operatively associated with the propulsion components 112 and other systems. For example, the engine 114 can be operatively coupled to and drive other power systems on the rotary mixer 100 such as a machine hydraulic system including one or more positive displacement hydraulic pumps 116 for pressurizing and directing hydraulic fluid through hydraulic conduits like hoses or tubing. In an embodiment, the propulsion components 112 may be hydrostatically driven and are operatively associated with hydraulic motors that can be fluidly coupled to the hydraulic pump 116 to receive pressurized hydraulic fluid there from causing rotation of the wheels. Another exemplary system that may be included with the rotary mixer 100 and powered by internal combustion engine 114 can be an electric alternator or electric generator 118 to generate electricity for an electrical system.

To accommodate an operator, the rotary mixer 100 can include an onboard operator cab or operator station 119 on the machine frame 104 at a location that provides visibility over and about the work surface 102 for conducting the milling operation. The operator station 119 can include various controls, readouts, and other input/output interfaces and instrumentation for monitoring and controlling operation of the rotary mixer 100. For example, the operator station 119 can include steering joysticks or steering handles for adjusting the travel direction of the rotary mixer 100, speed controls for adjusting the travel speed of the rotary mixer 100, and controls for adjusting the other systems associated with the rotary mixer 100 like the hydraulic pump 116 and the electric generator 118. In other embodiments, the rotary mixer 100 may be configured for remote operation and some or all of the foregoing operator controls may be located remotely from the onboard operator station 119.

To engage and fragment the work surface 102, the rotary mixer 100 can include a power driven cutting rotor 120 rotatably mounted on and supported by the machine frame 104. The cutting rotor 120 can be a drum-shaped, cylindrical structure having a plurality of picks or teeth-like cutting tools 122 disposed about its cylindrical surface. By way of example only, the cutting rotor 120 may be about 4.5 to 6 feet in diameter. The cylindrical cutting rotor 120 can rotate about a rotor axis 124 that is generally perpendicular to the travel direction 110 and that extends between the first and second lateral sides the machine frame 104. As the cutting rotor 120 rotates, the cutting tools 122 impact and penetrate into the work surface 102 fracturing the material thereof. The cutting tools 122 are adapted to penetrate into the work surface 102 and remove a portion of the material as the rotary mixer 100 advances along the travel direction 110 through a process referred to as milling or planning. In some embodiments, the cutting tools 122 may be removable from the cutting rotor 120 for replacement as they become worn or damaged.

To contain the fragmented material and debris, the cutting rotor 120 can be rotatably accommodated in a box-like housing or rotor enclosure 126 that extends from the machine frame 104 toward the work surface 102. The rotor enclosure 126 can be made from a plurality of metal plates and defines an enclosed space 128 in which the cutting rotor 120 is located. The rotor enclosure 126 can be located approximately mid-length on the machine frame 104 between the forward end 106 and the rearward end 108 so that the machine weight can be disposed on the cutting rotor 120 to assist in penetrating the work surface 102 and so as to maintain a uniform cut depth. In the embodiment of the rotary mixer 100 used in a work surface reclamation process, the enclosed space 128 defined by the rotor enclosure 126 can function as a mixing chamber that can be operatively associated with other systems to receive water or other materials for mixing with the fragmented debris. When the cutting rotor 120 rotates in the rotor enclosure 126, the rotation mixes the fragments and materials that can be redeposited on the work surface 102.

To vertically raise and lower the cutting rotor 120 with respect to the work surface 102, a hydraulic piston 130 can be located on each lateral side of the rotary mixer 100 and can be connected between the machine frame 104 and the rotor enclosure 126. The forward end of the rotor enclosure 126 can also be attached to the machine frame 104 via a pivotal connection 132. The hydraulic pistons 130 can be operatively associated with the hydraulic system on the rotary mixer 100 and can be fluidly coupled to the hydraulic pump 116 via hydraulic lines. Directing pressurized hydraulic fluid to and from the hydraulic pistons 130 causes the pistons to telescopically expand or contract, thereby increasing or decreasing the length of the pistons extending between the machine frame 104 and the rotor enclosure 126. The rotor enclosure 126 thus pivots or tilts about the pivotal connection 132 and hence the cutting rotor 120 is brought into contact and can penetrate into the work surface 102 during the milling operation and the depth of the milling cut can be controlled through selective adjustment of the extension of the hydraulic pistons 130. In addition, the hydraulic pistons 130 can be fully retracted to vertically lift the cutting rotor 120 from the work surface 102 so the rotary mixer 100 can freely travel about the work surface.

Figure 2:
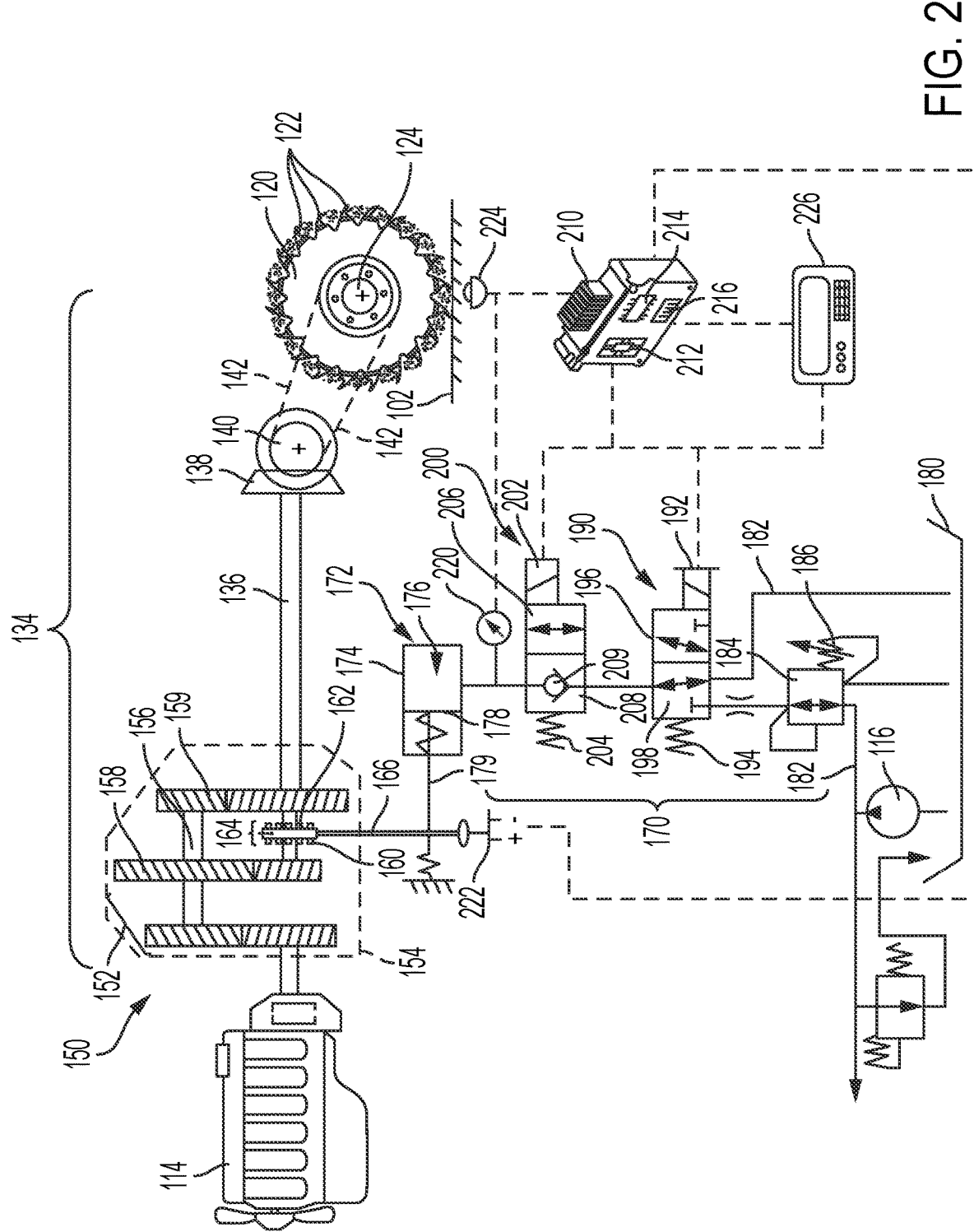
FIG. 2 is a schematic representation of the components of the rotor drivetrain for a propelled milling machine including a hydraulically actuated rotor drive transmission configured to transfer mechanical power between the internal combustion engine and the cutting rotor and an associated rotor transmission hydraulic circuit.

To cause rotation, the cutting rotor 120 is operatively coupled to the internal combustion engine 114 via an assembly of components referred to as the drivetrain 134. Referring to FIGS. 1 and 2, the drivetrain 134 can include a driveshaft 136 joined to the crankshaft of the internal combustion engine 114 through a flywheel—clutch combination at the rear of the engine and which is supported along the machine frame 104 by bearings to extend rearwardly and proximate to the rotor enclosure 126. The driveshaft 136 can be coupled by a differential 138 or similar gear train to an axle 140 arranged perpendicular to the travel direction 110 of the rotary mixer 100. The differential 138 redirects the rotational motion and torque transmitted through the driveshaft 136 to the axle 140 at a right angle perpendicular to the travel direction 110 and parallel with the cutting rotor 120 and rotor axis 124. The axial ends of the axle 140 can be formed as sprockets or pulleys adapted to mesh with one or more rotor drive belts 142 (or in other possible embodiments drive chains) that extend to and pass about the rotor hub 144 that may be similarly formed as a sprocket. The drive belts 142 transmit mechanical power from the rotation of the axle 140 to rotor hub 144 causing rotation of the cutting rotor 120 about the rotor axis 124. The drive belts 142 may be enclosed in a belts housing 146 shown in FIG. 1. Other arrangements of different components are possible for the drivetrain 134.

In an embodiment, the rotary mixer 100 may be configured to operate the cutting rotor 120 at different rotational speeds and/or torques that can be selected depending upon the different materials being milled such as, for example, concrete compared to dirt. Additionally, the speed of the cutting rotor 120 may be selectively set for different operations such as pulverizing, blending, and mixing. To enable the selective changing of the speed of the cutting rotor 120, the drivetrain 134 can include or be associated with a rotor drive transmission 150. In an embodiment, the rotor drive transmission 150 can be disposed within the drivetrain 134 and coupled directly to the engine 114. In other embodiments, the rotor drive transmission 150 can be proximate to and coupled as a component incorporated with the cutting rotor 120 and receives motive power from the drive belts 142. In other embodiments, the rotor drive transmission 150 can be positioned at any suitable locating the rotor drivetrain 134. The rotor drive transmission 150 can include a plurality of selectively engageable gears 152 of different sizes disposed in a gearbox 154 that can vary the rotational speed of the cutting rotor 120 and, in a generally inverse relation, the torque developed by the cutting rotor 120. The gears 152 can have straight cut or diagonally cut teeth that mesh together such that rotation of the first gear rotateably drives the second gear. The diameters and the number and spacing of the teeth of the gears 152 can be different so that a pair of intermeshed gears will rotate at different rotational speeds. The rotor drive transmission 150 can be configured with multiple fixed gear ratios that represent different ratios between input speed and output speed of the transmission.

In the embodiment illustrated in FIG. 2, the rotor drive transmission 150 may be a two-speed transmission configured to selectively switch the rotational output of the internal combustion engine 114 between a higher ratio producing comparatively faster rotation and a lower ratio of a comparatively lower speed; however, other embodiments may include a greater number of speed ratios. Various configurations for the rotor drive transmission are contemplated by the disclosure, but in one possible embodiment, the rotational output from the crankshaft of the internal combustion engine 114 is transferred by intermeshed gears to a layshaft 156 that extends parallel to and offset from the driveshaft 136. The plurality of engageable gears 152 of the rotor drive transmission 150 may include a first pair of gears engageable in a high gear ratio 158 and a second pair of gears engageable in a low gear ratio 159. One gear of each of the high gear ratio 158 and the low gear ratio 159 is fixed to the layshaft 156 and the other gear of each of the high gear ratio 158 and low gear ratio 159 can be selectively fixed or released to the driveshaft 136, or to a complementary shaft concentrically joined with the driveshaft.

In the high gear ratio 158, the first gear fixed to the layshaft 156 may have a larger diameter and greater number of gear teeth than the second gear associated with the driveshaft 136. Conversely, in the low gear ratio 159, the first gear fixed to the layshaft 156 may have a smaller diameter and fewer teeth than the second gear associated with the driveshaft 136. If the second gear of the high gear ratio 158 is selectively fixed to the driveshaft 136 while the second gear of the low gear ratio 159 is selectively released, the rotational speed of the layshaft 156 will increase when transferred to the driveshaft 136, but at an inversely lower torque. Conversely, if the second of the low gear ratio 159 is fixed to the driveshaft 136 while the second gear of the high gear ratio 158 is released, the rotational speed of the layshaft 156 will be reduced when transferred to the driveshaft 136 but with an inverse increase in torque. Accordingly, selective engagement of the plurality of gears 152 enables the rotor drive transmission 150 to inversely change the rotational speed and power, or torque, transmitted though the drivetrain 134.

Various configurations for the shifting gear ratios are contemplated by the disclosure, but in one possible embodiment, to selectively engage the high gear ratio 158 or low gear ratio 159 to the driveshaft 136, the rotor drive transmission 150 can include a disc-shaped collar 160 concentrically disposed on the driveshaft 136. The collar 160 can axially slide with respect to the driveshaft 136 but may be splined to the driveshaft to rotationally lock the collar 160 to the driveshaft 136. The disc-shaped collar 160 can include mating structures 162 on each axial face that can mate with complementary structures on the second gears of the high and low gear ratios 158, 159 associated with the driveshaft 136. When the mating structure 162 of the collar 160 is selectively mated with one of the selected second gears of high or low gear ratio 158, 159, the respective gear ratio of the high or low gear ratio is locked in rotation with the driveshaft. In addition, the collar 160 may have an neutral position 164 intermediately between the high gear ratio 158 and the low gear ratio 159 in which the collar is disengaged with both gear ratios, thus placing the rotor drive transmission 150 in neutral and without the transfer of rotary motion to the driveshaft 136.

To move the collar 160 axially over the driveshaft 136 between the high and low gear ratios 158, 159 and selectively engage the plurality of gears 152, the rotor drive transmission 150 can be hydraulically actuated and may be operatively associated with a rotor transmission hydraulic circuit 170. In an embodiment, the rotor transmission hydraulic circuit 170 can include various components for converting hydraulic fluid pressure into mechanical motion for moving the collar 160 between the high gear ratio 158 and the low gear ratio 159. For example, the rotor transmission hydraulic circuit 170 may include a hydraulic gearshift actuator 172 that is coupled to a collar rod 166 extending from the collar 160 perpendicularly to the driveshaft 136. Movement of the collar rod 166 axially with respect to the driveshaft 136 will slide the collar along the driveshaft between the high gear ratio 158, low gear ratio 159, and neutral position 164.

The hydraulic gearshift actuator 172 can take the form of a hydraulic cylinder having a tubular cylindrical body 174 delineating an actuator chamber 176 and a piston 178 slidably disposed therein with a piston rod 179 that extends from the cylindrical body 174. Reciprocally sliding the piston 178 within the actuator chamber 176 will extends and retract the piston rod 179 with respect to the cylindrical body 174. The distal end of the piston rod 179 can connect with the distal end of the collar rod 166 at an orthogonal angle thereto and the piston rod 179 can be parallel with the driveshaft 136. Thus, extension and retraction of the piston rod 179 translates to linearly moving the collar 160 along the axial direction of the driveshaft 136.

To cause the piston 178 to move within the cylindrical body 174, pressurized hydraulic fluid can be introduced into the actuator chamber 176 on one side of the piston thereby displacing the piston toward the opposite end of the actuator chamber. In the illustrated embodiment, the hydraulic gearshift actuator 172 can be a single acting cylinder with one fluid port disposed in the cylindrical body 174 and communicating with the actuator chamber 176 on only one side of the piston 178. In another embodiment, the hydraulic gearshift actuator 172 can be a double acting cylinder with fluid ports communicating with the actuator chamber 176 on either side of the piston 178. In a double acting cylinder, introducing hydraulic fluid to the actuator chamber 176 through one or the other ports on either side of the piston 178 will displace the piston toward the opposite end of the cylindrical body 174. In an embodiment, the hydraulic gearshift actuator 172 may also include internal springs biasing the piston 178 towards a particular end of the cylindrical body 174.

To supply hydraulic fluid to the hydraulic gearshift actuator 172, the rotor transmission hydraulic circuit 170 can be operatively associated with the hydraulic system of the rotary mixer including the hydraulic pump 116 thereon. The hydraulic pump 116 can be in fluid communication with a fluid reservoir 180 or fluid tank that accommodates hydraulic fluid. The fluid reservoir 180 may be vented or pressurized and desirably is sized to accommodate a sufficient quantity of hydraulic fluid for operation of the rotor transmission hydraulic circuit 170 and other circuits of the hydraulic system. The hydraulic pump 116 can be a fixed or variable displacement pump and can have any suitable design for a pump such as a piston pump, vane pump, diaphragm pump or the like. The hydraulic pump 116 can receive hydraulic fluid from the fluid reservoir 180, pressurize the fluid, and direct the fluid through a plurality of interconnected fluid conduits 182 that may be in the form of tubes or pipes.

In an embodiment, the hydraulic pump 116 can be a fixed displacement pump and may raise the pressure of the hydraulic fluid in excess of the operating pressures of the rotor transmission hydraulic circuit 170. To reduce the hydraulic pressure of the inflowing hydraulic fluid, the rotor transmission hydraulic circuit 170 can include a pressure reducing valve 184. The pressure reducing valve 184 is adjustable to alter the quantity and pressure of the hydraulic fluid that passes there through and thus can adjust the hydraulic pressure of the inflowing fluid from the hydraulic pump 116. For example, the pressure reducing valve 184 can be configured with an adjustable spring 186 that exerts a spring force that increases or restricts the quantity of hydraulic fluid directed into the rotor transmission hydraulic circuit 170 and thus controls the hydraulic pressure within the circuit.

To selectively direct hydraulic fluid to and from the hydraulic gearshift actuator 172, the rotor transmission hydraulic circuit 170 can include a gearshift directional control valve 190. The gearshift directional control valve 190 is disposed to establish fluid communication between the hydraulic gearshift actuator 172 and alternatively either of the hydraulic pump 116 and the fluid reservoir 180. In an embodiment, the gearshift directional control valve 190 can be a two-position, four-way valve that can be actuated by an electromagnetic solenoid 192 to change the position of an internal spool that may be biased against a spring 194. When the solenoid 192 is electromagnetically activated, the solenoid moves or configures the spool to seal and unseal various ports disposed in the gearshift directional control valve 190 that are in fluid communication with the hydraulic gearshift actuator 172.

For example, the gearshift directional control valve 190 can include a first position 196 or configuration that places the hydraulic gearshift actuator 172 in fluid communication with the hydraulic pump 116. Pressurized hydraulic fluid can flow into the actuator chamber 176 of the hydraulic gearshift actuator 172 raising the pressure therein and displacing the piston 178 to extend the piston rod 179 from the cylindrical body 174. Moreover, when the gearshift directional control valve 190 is in the first position 196, the hydraulic gearshift actuator 172 is fluidly isolated or sealed from the fluid reservoir 180. Thus, the hydraulic pressure in the hydraulic gearshift actuator 172 may be the same as the elevated hydraulic pressure introduced to the rotor transmission hydraulic circuit 170 through the pressure reducing valve 184. To relieve hydraulic pressure in the hydraulic gearshift actuator 172, the gearshift directional control valve 190 can have a second position 198 or configuration that places the hydraulic gearshift actuator 172 in fluid communication with the fluid reservoir 180 while isolating or sealing the hydraulic gearshift actuator 172 from the hydraulic pump 116. Hydraulic fluid can therefore flow from the hydraulic gearshift actuator 172 to the fluid reservoir 180 thereby reducing hydraulic pressure in the actuator chamber 176. The piston 178 can therefore move to the opposite end of hydraulic gearshift actuator 172 and retract the piston rod 179 into the cylindrical body 174.

From the foregoing, it will be appreciated that by directing pressurized hydraulic fluid to hydraulic gearshift actuator 172 and raising the hydraulic pressure therein moves the collar 160 to engage, or mate with, the high gear ratio 158. Alternatively, directing hydraulic fluid from the hydraulic gearshift actuator 172 to the fluid reservoir 180 and lowering the hydraulic pressure therein moves the collar 160 out of engagement with the high gear ratio 158 and possibly into engagement with the low gear ratio 159. The hydraulic pressure inside the hydraulic gearshift actuator 172 thus determines whether the rotor drive transmission is in the high gear ratio 158, low gear ratio 159, or whether the collar 160 is in the neutral position 164.

There may be certain fault conditions or situations where the engageable gears 152 and/or the collar 160 unintentionally attempts to disengage or unmate while the rotor drive transmission 150 is still transmitting a motive force there through to the cutting rotor 120. These fault conditions may result in or from the loss of hydraulic pressure in the hydraulic gearshift actuator 172. The unintentional loss of hydraulic pressure in the hydraulic gearshift actuator 172 while the rotor drive transmission is actively transmitting power can result in chatter and damage to intermeshed gear teeth of the plurality of gears 152 or the mating structures 162 on the collar 160.

To avoid or reduce possible damage due to the plurality of gears 152 and/or collar 160 from unintentionally disengaging while motive power is transmitted through the rotor drive transmission 150, the rotor transmission hydraulic circuit 170 can include a gearshift trapping valve 200. The gearshift trapping valve 200 can be disposed in fluid communication between the hydraulic gearshift actuator 172 and the gearshift directional control valve 190. In the event of a fault condition, the gearshift trapping valve 200 can isolate the hydraulic gearshift actuator 172 to seal or trap the pressurized hydraulic fluid therein, thereby preserving the present hydraulic pressure conditions of the hydraulic gearshift actuator 172 and the gear settings of the rotor drive transmission 150.

In an embodiment, the gearshift trapping valve 200 can be a two-position, two-way valve that can be actuated by an electromagnetic solenoid 202 that operates against a biasing spring 204. The gearshift trapping valve 200 can include a first position 206 in which hydraulic fluid can flow in either direction through the gearshift trapping valve 200. When the gearshift trapping valve 200 is in the first position 206, hydraulic fluid can readily flow in either direction between the hydraulic gearshift actuator 172 and the gearshift directional control valve 190, and thus from the hydraulic pump 116 and/or onto the fluid reservoir 180. The second position 208 or configuration may permit flow of hydraulic fluid in only one direction though the gearshift trapping valve 200. The second position 208 may be embodied as a poppet check valve 209. When hydraulic fluid pressure is applied to one side of the poppet check valve 209, the ball or check is forced into a close position and no hydraulic fluid can flow past it. When hydraulic fluid pressure is applied to the other side of the ball or check, the ball or check is dislodged from the closed position and hydraulic fluid can flow through the gearshift trapping valve 200. The gearshift trapping valve 200 is arranged in the rotor transmission hydraulic circuit 170 so that the second position 208 associated with the poppet check valve 209 allows hydraulic flow to the hydraulic gearshift actuator 172 but prevents hydraulic flow from the hydraulic gearshift actuator 172.

To regulate operation of the rotor drive transmission 150 by way of manipulating the rotor transmission hydraulic circuit 170, an electronic controller 210, also referred to as an electronic control module (ECM) or electronic control unit (ECU), can be included. The electronic controller 210 can include various circuitry components for receiving and processing data and software to operate the rotor drive transmission 150. Additionally, the electronic controller 210 can be responsible for processing functions associated with various other systems on the rotary mixer, including the hydraulic system associated with the hydraulic pump 116. While the electronic controller 210 is illustrated as a stand-alone device, its functions may be distributed among a plurality of distinct and separate components.

For example, the electronic controller 210 can include one or more microprocessors 212 such as a central processing unit (CPU), an application specific integrated circuit (ASIC), or a field programmable gate array (FPGA) comprising a plurality of transistors and similar circuits that are capable of reading, manipulating and outputting data in electronic form. The electronic controller 210 can include non-transient programmable memory 214 or other data storage capabilities that may be in random access memory or more permanent non-volatile forms of data storage media. Common examples of computer-readable memory 214 include RAM, PROM, and EPROM, a FLASH-EPROM, and any other memory chip or cartridge. The memory is capable of storing in software form the programming instructions and the data that can be read and processed by the microprocessor 212. The software and data may take the form of instruction sets, programs, applications, routines, libraries, databases, lookup tables, data sets, and the like. To communicate with other instruments and actuators associated with the rotor drive transmission 150 and/or the rotor transmission hydraulic circuit 170, the electronic controller 210 can include various input/output ports 216 and related circuitry. Communication may be established by sending and receiving digital or analog signals across electronic communication lines or communication busses using any suitable data communication protocols. The various communication and command channels are indicated in dashed lines for illustration purposes.

For example, to measure or sense the hydraulic pressure in the rotor transmission hydraulic circuit 170, the electronic controller 210 can be associated with and in electronic communication with a hydraulic pressure sensor 220. The hydraulic pressure sensor 220 may function as a transducer measuring the force being applied by the flowing hydraulic fluid and can output that information in the form of non-transitory electronic signals to the electronic controller 210. The hydraulic pressure sensor 220 can operate on any suitable pressure sensing technology including piezoelectric sensing, capacitive sensing, electromagnetic systems, optical sensing or otherwise. The hydraulic pressure sensor 220 may sense pressure readings in terms of either static or dynamic pressures. The hydraulic pressure sensor 220 can be disposed at any suitable location within the rotor transmission hydraulic circuit 170 to measure localized hydraulic pressure and changes in pressure. For example, the hydraulic pressure sensor 220 may be disposed proximate to and in fluid communication with the hydraulic gearshift actuator 172 upstream of the gearshift trapping valve 200 and the gearshift directional control valve 190. In other embodiments, the hydraulic pressure sensor 220 can be disposed upstream of the pressure reducing valve 184 to monitor hydraulic pressure from the hydraulic pump 116 including variation or loss of pressure therefrom.

To measure the operating conditions or settings associated with the rotor drive transmission 150, the electronic controller 210 can be associated with and in electronic communication with a rotor drive transmission sensor 222. The rotor drive transmission sensor 222 can be arranged with respect to the rotor drive transmission 150 so as to monitor or sense the selected high or low gear ratio 158, 159 of the plurality of engageable gears 152 or, where appropriate, the neutral position 164 of the collar 160. The rotor drive transmission sensor 222 can sense the selected gear ratio and the rotational speed transmitted though the rotor drive transmission 150 and output that information in the form of non-transitory electronic signals to the electronic controller 210. The rotor drive transmission sensor 222 can operate on any suitable principle and, in an embodiment, may be a limit switch operatively disposed to sense the linear position of the collar rod 166 disposed between the high and low gear ratios 158, 159.

To sense the operational conditions associated with the cutting rotor 120, the electronic controller 210 can be associated with and in electronic communication with a cutting rotor sensor 224. The cutting rotor sensor 224 can be configured with respect to the cutting rotor 120 to determine for example, whether the cutting rotor 120 is milling and penetrating into a work surface 102 or whether it is elevated above and separated from the work surface 102. The cutting rotor sensor 224 can operate on any suitable principle and, in an embodiment, may be an optical sensor focused at the intersection of the cutting rotor 120 and work surface 102 or it may be elevation sensor measuring the elevation between the between the cutting rotor and work surface. Examples of other operating conditions that may be sensed or monitored by the electronic controller include engine speed, operator performance requests, cutting rotor speed, clutch engagement, and other conditions.

In an embodiment, the electronic controller 210 can be operatively associated with a visual display or human machine interface (HMI) 226 to interact with a human operator. The HMI 226 can be located either onboard the rotary mixer for example, in the operator station or may be located off board in embodiments where the rotary mixer is configured for remote operation. The HMI 226 can be configured to provide visual or numeric representations regarding the operating characteristics of the rotor drive transmission 150 and the rotor transmission hydraulic circuit 170. The HMI 226 can include input functionalities such as keypads, dials, knobs and the like to receive commands and inputs from the operator, and may include touch screen capabilities and the like.

In an embodiment, the electronic controller 210 can be configured to operate the rotor transmission hydraulic circuit 170 to regulate the direction of hydraulic fluid flowing therein and thus the hydraulic pressure in the hydraulic gearshift actuator 172. For example, the electronic controller 210 can be in electronic communication with the gearshift directional control valve 190 and with the gearshift trapping valve 200. The electronic controller 210 can send and receive electronic signals regarding the status and operation of those valves. Additionally, the electronic controller 210 can send and transmit power signals to the solenoids 192, 202 operatively associated with the respective gearshift directional control valve 190 and the gearshift trapping valve 200. By energizing or de-energizing the solenoids 192, 202, the electronic controller 210 can selectively actuate the gearshift directional control valve 190 and the gearshift trapping valve 200 into their first and second positions. The electronic controller 210 can therefore operate the rotor transmission hydraulic circuit 170 to select the high gear ratio 158, low gear ratio 159, and neutral position 164 configurations of the rotor transmission hydraulic circuit 170.

INDUSTRIAL APPLICABILITY

In accordance with the disclosure, by inclusion of the gearshift trapping valve 200, the rotor transmission hydraulic circuit 170 can be configured to address various fault conditions that can result in the unintentional loss of hydraulic pressure in the hydraulic gearshift actuator 172. Because the gearshift trapping valve 200 can isolate and trap hydraulic fluid in the hydraulic gearshift actuator 172 in the event of such fault conditions, it can prevent the unintentional disengagement of the plurality of gears 152 and/or collar 160 of the rotor drive transmission 150 while the rotor drive transmission 150 is transmitting motive power and torque to the cutting rotor 120. The gearshift trapping valve 200 can maintain the hydraulic pressure in the hydraulic gearshift actuator 172 thus maintaining the previously set gear ratio of the rotor drive transmission 150 until the fault condition has been resolved. Thereafter, the gear ratios of the rotor drive transmission 150 can be shifted or adjusted, thus avoiding damage to the plurality of gears 152 and/or the collar 160.

Referring to FIG. 3, with reference to the prior figures, there is illustrated different operational configurations and settings in a configuration chart 300 for the rotor drive transmission 150 and rotor transmission hydraulic circuit 170 to address an electrical fault. An electrical fault may occur if the electronic controller 210 is unintentionally powered off or damaged, or if the electronic communication lines between the electronic controller 210 and the rotor transmission hydraulic circuit 170 are severed. An electrical fault may also occur if battery power to the electronic controller 210 is lost so that the electronic controller is no longer able to communicate with the rotor transmission hydraulic circuit 170. In an electrical fault condition, the gearshift directional control valve 190 and the gearshift trapping valve 200 and the electronic controller 210 can no longer communicate by sending and receiving data and power signals.

The gearshift directional control valve 190 may be configured so that, when the solenoid is de-energized, the biasing spring 194 biases the internal spool so that the gearshift directional control valve 190 is in the second position 198 establishing fluid communication between the hydraulic gearshift actuator 172 and the fluid reservoir 180. Hydraulic fluid therefore flows from the hydraulic gearshift actuator 172 to the fluid reservoir 180 relieving hydraulic pressure in the hydraulic gearshift actuator 172. The gearshift directional control valve 190 may become de-energized if the electronic controller 210 becomes damaged and no longer transmits power to the solenoid 192.

To maintain the hydraulic pressure in the hydraulic gearshift actuator 172, the gearshift trapping valve 200 can be configured so that when its solenoid 202 is de-energized, for example, due to the electrical fault, the biasing spring 204 shifts the gearshift trapping valve 200 to the second position isolating the hydraulic gearshift actuator 172. For example, the poppet check valve 209 prevents hydraulic fluid from flowing though the gearshift trapping valve 200 from the hydraulic gearshift actuator 172 to the fluid reservoir 180. Hydraulic pressure is maintained in the hydraulic gearshift actuator 172 and the previously set gear ratio of the rotor drive transmission 150 is maintained. When the gearshift trapping valve 200 is reenergized, the solenoid 202 shifts the gearshift trapping valve to the first position reestablishing fluid communication between the hydraulic gearshift actuator 172 and the gearshift directional control valve 190 and the selected gear ratios of the rotor drive transmission 150 can be adjusted.

Figure 4:
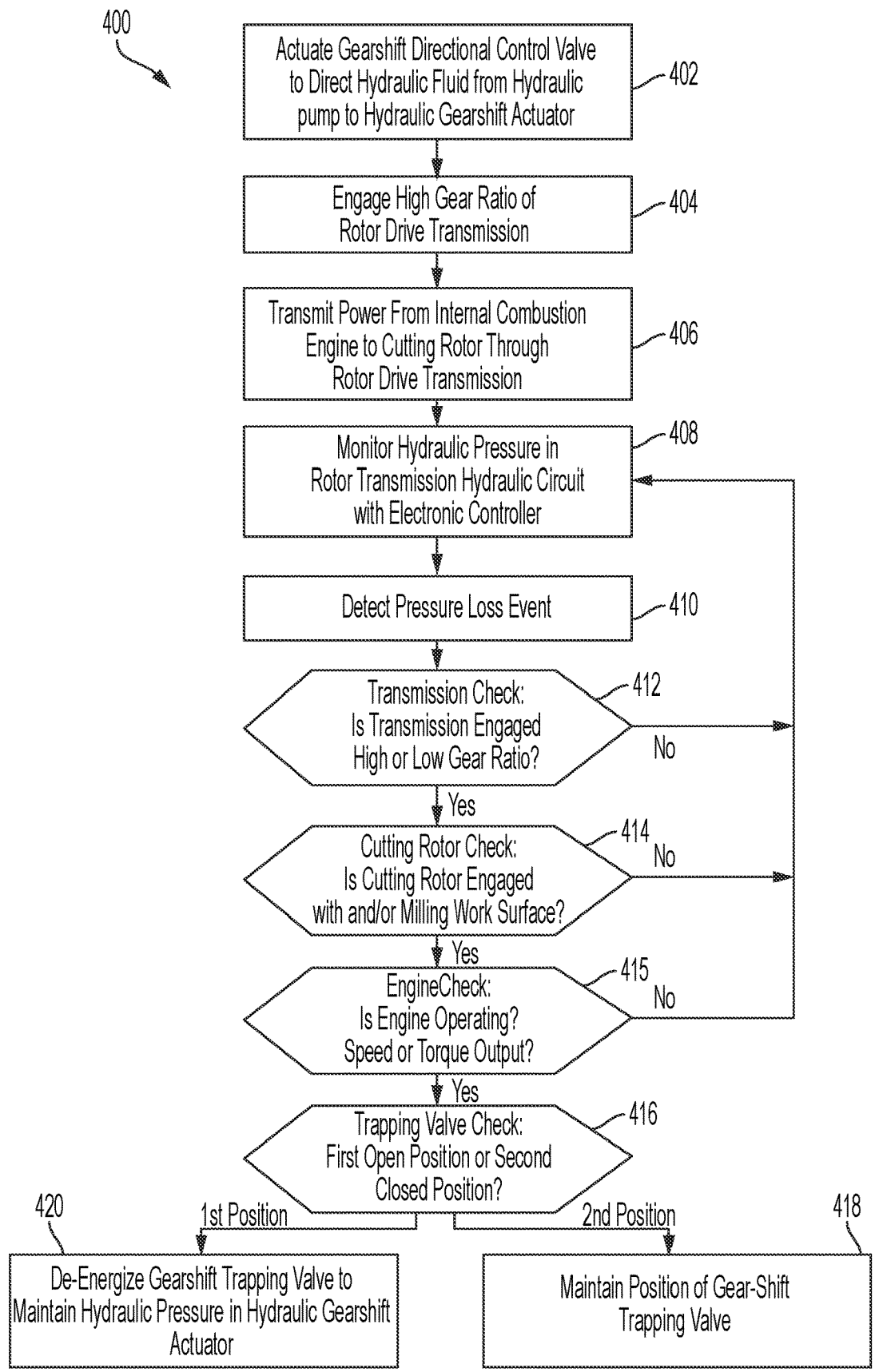
FIG. 4 is a flow diagram of a possible routine, process, or series of steps that may occur with the rotor transmission hydraulic circuit in the event of a fault condition.

Referring to FIG. 4, with reference the prior figures, there is illustrated a flow chart of possible steps that may be associated with a process 400 configured to address a pressure fault condition resulting in the unintended loss of hydraulic pressure in the rotor transmission hydraulic circuit 170. Such a pressure fault condition may result from the unintentional powering down of the hydraulic pump 116 or piercing of the fluid conduits 182 of the rotor transmission hydraulic circuit 170. In accordance with the process 400, in an initial actuation step 402, the gearshift directional control valve 190 can be actuated to direct pressurize hydraulic fluid from the hydraulic pump 116 to the hydraulic gearshift actuator 172. This can be accomplished, for example, by energizing the solenoid 192 to shift the gearshift directional control valve 190 to the first position 196.

When the gearshift directional control valve 190 is in the first position 196 and pressurized hydraulic fluid is received in the hydraulic gearshift actuator 172, a gear engagement step 404 can occur in which the rotor drive transmission 150 assumes a selected gear ratio, for example, the high gear ratio 158. Thereafter, in a power transmission step 406, motive power can be transmitted from the internal combustion engine 114 through the rotor drive transmission 150 to the driveshaft 136 and to the cutting rotor 120. In the high gear ratio 158, the cutting rotor 120 may be rotating at significant speeds and forces.

The process 400 can be responsive to various fault conditions that can occur with the rotor transmission hydraulic circuit 170 or that can occur with the electronic controller 210. For example, as described above, there may be a loss of hydraulic pressure in the rotor transmission hydraulic circuit 170 due to piercing or decoupling of the fluid conduits 182 or leakage in other components of the rotor transmission hydraulic circuit. Another example of a fault condition may be due to loss of power to the electronic controller 210 or other electrically actuated components of the rotor transmission hydraulic circuit 170.

The process 400 can include one or more steps or checks to monitor the operation and integrity of the rotor transmission hydraulic 170 and to register and assess a fault condition and its severity. The following descriptions of different steps or checks are non-limiting examples only and may be conducted in any order, number, or priority. For example, the process 400 can include a monitoring step 408 in which the electronic controller 210 monitors operating aspects of the rotary mixer. For example, the electronic controller can monitor the rotor transmission hydraulic circuit 170 and the hydraulic pressure in the circuit using the hydraulic pressure sensor 220. The electronic controller 210 may be monitoring the hydraulic pressure in the rotor transmission hydraulic circuit 170 via the hydraulic pressure sensor 220 and may register a pressure loss event 410. In other words, the hydraulic pressure sensor 220 senses and communicates a drop or decrease of hydraulic pressure. The electronic controller 210 can be programmed to assess and determine whether the pressure loss event 410 should be associated with a pressure fault or whether the hydraulic pressure decrease may be intentional or may be irrelevant.

For example, in an embodiment, the electronic controller 210 can perform a transmission check step 412 in which it determines whether the rotor drive transmission 150 is engaged in a gear ratio and which of the high or low gear ratios 158, 159 it is engaged in. The electronic controller 210 can conduct the transmission check step 412 using the rotor drive transmission sensor 222 operatively associated with the rotor drive transmission 150 and which the electronic controller is in electronic with. The transmission check step 412 may also determine whether or not the rotor drive transmission 150 is transmitting motive power. In the event the rotor drive transmission 150 is in the neutral position 164 or is not transmitting motive power, the pressure loss event 410 may be intended or irrelevant and the process 400 can return to monitoring the hydraulic pressure of the rotor transmission hydraulic circuit 170. The transmission check step 412 can also monitor or determine the operator requested gear ratio for the rotor drive transmission 150.

In an embodiment, the electronic controller 210 can also perform a cutting rotor check step 414 in which it determines whether the cutting rotor 120 is engaged with the work surface 102 in a milling operation and the speed of the cutting rotor 120. In another example, using the cutting rotor sensor 224, the electronic controller 210 can determine the relative elevation between the cutting rotor 120 and the work surface 102. If the cutting rotor 120 and work surface 102 are not engaged, the pressure loss event 410 may be intended or irrelevant.

In another example, the electronic controller 210 can perform an engine check step 415 to determine if the internal combustion engine 114 is operating and the speed and torque output of the internal combustion engine. For example, if the internal combustion engine 114 is not operating, then the cutting rotor is not engaged and any fault conditions may be irrelevant.

If the transmission check step 412, the cutting rotor check step 414, and the engine check step 415 are affirmative, the electronic controller 210 may determine that the pressure loss event 410 is indicative of a pressure fault condition. To prevent unintended damage to the plurality of gears 152 and/or collar 160 of the rotor drive transmission 150, the process 400 can respond accordingly by way of the rotor transmission hydraulic circuit 170. For example, the process can include a trapping valve check step 416 in which the electronic controller 210 uses the gearshift trapping valve 200 to maintain hydraulic pressure in the hydraulic gearshift actuator 172. The trapping valve check step 416 can determine whether the gearshift trapping valve 200 is in the opened first position 206 or closed second position 208. If the gearshift trapping valve 200 is in the normally closed second position 208, the electronic controller 210 may do nothing and the process 400 in block 418 maintains the second position of the gearshift trapping valve 200. The poppet check valve 209 will therefore prevent fluid flow from the hydraulic gearshift actuator 172 thereby maintaining hydraulic pressure therein and the selected gear ratio of the rotor drive transmission 150.

If the trapping valve check step 416 determines the gearshift trapping valve 200 is in the opened first position 206, the electronic controller 210 can conduct an actuation or de-energization step 420 and stop transmitting power signals to the solenoid 202 to de-energize the gearshift trapping valve 200 and shift it into the second position 208 in which the poppet check valve 209 prevents fluid flow from the hydraulic gearshift actuator 172. When the pressure loss event 410 has been corrected, the solenoid 202 can be re-energized to shift the gearshift trapping valve 200 to the first position reestablishing fluid communication between the hydraulic gearshift actuator 172 and the gearshift directional control valve 190 and the selected gear ratios of the rotor drive transmission 150 can be adjusted.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A propelled milling machine comprising:
    a machine frame supported on a plurality of propulsion components for travel over a work surface;
    an internal combustion engine supported on the machine frame and operatively associated with the plurality of propulsion components for propelling the propelled milling machine;
    a cutting rotor rotatably supported by the machine frame for milling a work surface;
    a rotor drive transmission operatively driven by the internal combustion engine and operatively associated with the cutting rotor to rotate the cutting rotor with respect to the machine frame, the rotor drive transmission including a plurality of gears selectively engageable with each other to adjust rotational speed of the cutting rotor, the plurality of gears including at least a high gear ratio and a low gear ratio;
    a rotor transmission hydraulic circuit in fluid communication with a hydraulic pump to receive hydraulic fluid and with a fluid reservoir to return hydraulic fluid, the rotor transmission hydraulic circuit including a hydraulic gearshift actuator operatively associated with the plurality of gears, a gearshift directional control valve to selectively establish fluid communication between the hydraulic gearshift actuator and one of the hydraulic pump and the fluid reservoir, and a gearshift trapping valve disposed in fluid communication between the hydraulic gearshift actuator and the gearshift directional control valve, the gearshift trapping valve configured to maintain hydraulic pressure in the hydraulic gearshift actuator in occurrence of a fault condition, the rotor transmission hydraulic circuit further including a pressure sensor to measure hydraulic pressure therein, and
    an electronic controller in electronic communication with the rotor transmission hydraulic circuit and the pressure sensor, and the fault condition is a pressure loss event with the rotor transmission hydraulic circuit as sensed by the pressure sensor.

2. The propelled milling machine of claim 1, wherein the gearshift trapping valve is configured to maintain hydraulic pressure in the hydraulic gearshift actuator when de-energized.

3. The propelled milling machine of claim 2, wherein the gearshift trapping valve includes a poppet check valve positioned between the hydraulic gearshift actuator and the gearshift directional control valve when the gearshift trapping valve is de-energized.

4. The propelled milling machine of the claim 3, wherein the gearshift trapping valve establishes two-way fluid communication between the hydraulic gearshift actuator and the gearshift directional control valve when energized.

5. The propelled milling machine of claim 4, wherein the gearshift directional control valve is configured to establish fluid communication between the hydraulic gearshift actuator and the fluid reservoir when de-energized.

6. The propelled milling machine of claim 5, wherein the gearshift directional control valve is configured to establish fluid communication between the hydraulic pump and the hydraulic gearshift actuator when energized.

7. The propelled milling machine of claim 1, further comprising the electronic controller in electronic communication with the rotor transmission hydraulic circuit, and the electronic controller is programmed to use the gearshift trapping valve to maintain hydraulic pressure in the hydraulic gearshift actuator in occurrence of the fault condition.

8. The propelled milling machine of claim 1, wherein the rotor transmission hydraulic circuit includes a pressure reducing valve disposed in fluid communication between the hydraulic pump and the gearshift directional control valve to adjust hydraulic pressure in the rotor transmission hydraulic circuit.

9. The propelled milling machine of claim 1, wherein the hydraulic gearshift actuator is a hydraulic cylinder including a piston reciprocally moveable in a cylindrical body in response to introduction and/or removal of hydraulic fluid in an actuator chamber defined by the cylindrical body.

10. A propelled milling machine comprising:
    a machine frame supported on a plurality of propulsion components for travel over a work surface,
    an internal combustion engine supported on the machine frame and operatively associated with the plurality of propulsion components for propelling the propelled milling machine;
    a cutting rotor rotatably supported by the machine frame for milling a work surface;
    a rotor drive transmission operatively driven by the internal combustion engine and operatively associated with the cutting rotor to rotate the cutting rotor with respect to the machine frame, the rotor drive transmission including a plurality of gears selectively engageable with each other to adjust rotational speed of the cutting rotor, the plurality of gears including at least a high gear ratio and a low gear ratio;

a rotor transmission hydraulic circuit in fluid communication with a hydraulic pump to receive hydraulic fluid and with a fluid reservoir to return hydraulic fluid, the rotor transmission hydraulic circuit including a hydraulic gearshift actuator operatively associated with the plurality of gears, a gearshift directional control valve to selectively establish fluid communication between the hydraulic gearshift actuator and one of the hydraulic pump and the fluid reservoir, and a gearshift trapping valve disposed in fluid communication between the hydraulic gearshift actuator and the gearshift directional control valve, the gearshift trapping valve configured to maintain hydraulic pressure in the hydraulic gearshift actuator in occurrence of a fault condition;

a pressure sensor disposed to measure localized hydraulic pressure; and an electronic controller in electronic communication with the rotor transmission hydraulic circuit and the pressure sensor, the electronic controller is programmed to use the gearshift trapping valve to maintain hydraulic pressure in the hydraulic gearshift actuator in occurrence of the fault condition, wherein the fault condition is a pressure loss event in the rotor transmission hydraulic circuit, and wherein the electronic controller is programmed to conduct a trapping valve check step to determine whether to de-energize the trapping valve to actuate a poppet check valve to prevent fluid communication between the hydraulic gearshift actuator and the gearshift directional control valve.

11. The propelled milling machine of claim 10, wherein the electronic controller is programmed to conduct one or more of:

a transmission check to determine if the rotor drive transmission is engaged in one of the high gear ratio and the low gear ratio on occurrence of the pressure loss event in the rotor transmission hydraulic circuit;

a cutting rotor check to determine if the cutting rotor is engaged with the work surface on occurrence of the pressure loss event in the rotor transmission hydraulic circuit; and an engine check to determine one or more of whether the internal combustion engine is operating, the speed of the internal combustion engine, and the torque output of the internal combustion engine on occurrence of the pressure loss event.

12. The propelled milling machine of claim 11, further comprising a hydraulic pressure sensor in electronic communication with the electronic controller and disposed to monitor hydraulic pressure in the rotor transmission hydraulic circuit.

13. A method of operating a rotor drive transmission operatively associated with an electronic controller, the method comprising:

actuating a gearshift directional control valve to direct pressurized hydraulic fluid from a hydraulic fluid source to a hydraulic gearshift actuator operatively associated with the rotor drive transmission;

engaging a plurality of gears in the rotor drive transmission to establish a gear ratio of the rotor drive transmission;

transmitting motive power from an internal combustion engine to a cutting rotor through the rotor drive transmission in the gear ratio; and actuating a gearshift trapping valve disposed between the gearshift directional control valve and the hydraulic gearshift actuator to maintain hydraulic pressure in the hydraulic gearshift actuator upon occurrence of a fault condition with a rotor transmission hydraulic circuit, the rotor transmission hydraulic circuit including the gearshift directional control valve and the hydraulic gearshift actuator, sensing the fault condition with a pressure sensor operatively associated with the rotor drive hydraulic circuit, wherein the fault condition is a hydraulic pressure fault indicating a loss of hydraulic pressure in the rotor transmission hydraulic circuit.

14. The method of claim 13, wherein the step of actuating the gearshift trapping valve to maintain hydraulic pressure in the hydraulic gearshift actuator includes positioning a poppet check valve of the gearshift trapping valve to prevent fluid communication between the gearshift directional control valve and the hydraulic gearshift actuator.

15. The method of claim 13, wherein the step of actuating the gearshift directional control valve to direct pressurized hydraulic fluid to the hydraulic gearshift actuator includes positioning the gearshift trapping valve to establish fluid communication between the gearshift directional control valve and the hydraulic gearshift actuator.

16. A rotor transmission hydraulic circuit operatively associated with a rotor drive transmission operatively disposed between an internal combustion engine and a cutting rotor, the rotor transmission hydraulic circuit comprising:

a hydraulic gearshift actuator operatively associated with a plurality of gears in the rotor drive transmission to selectively engage the plurality of gears in one or more gear ratios;

a gearshift directional control valve to selectively establish fluid communication between the hydraulic gearshift actuator and one of a hydraulic pump and a fluid reservoir; and a gearshift trapping valve disposed in fluid communication between the hydraulic gearshift actuator and the gearshift directional control valve, the gearshift trapping valve positionable to establish fluid communication between the hydraulic gearshift actuator and the gearshift directional control valve when energized and to maintain hydraulic pressure in the hydraulic gearshift actuator when de-energized upon occurrence of a fault condition, a pressure sensor operatively associated with the rotor transmission hydraulic circuit to sense hydraulic pressure therein; and an electronic controller in electronic communication with the rotor transmission hydraulic circuit and the pressure sensor, and the fault condition is a pressure loss event with the rotor transmission hydraulic circuit as sensed by the pressure sensor.

* * * * *